UNITED STATES PATENT OFFICE.

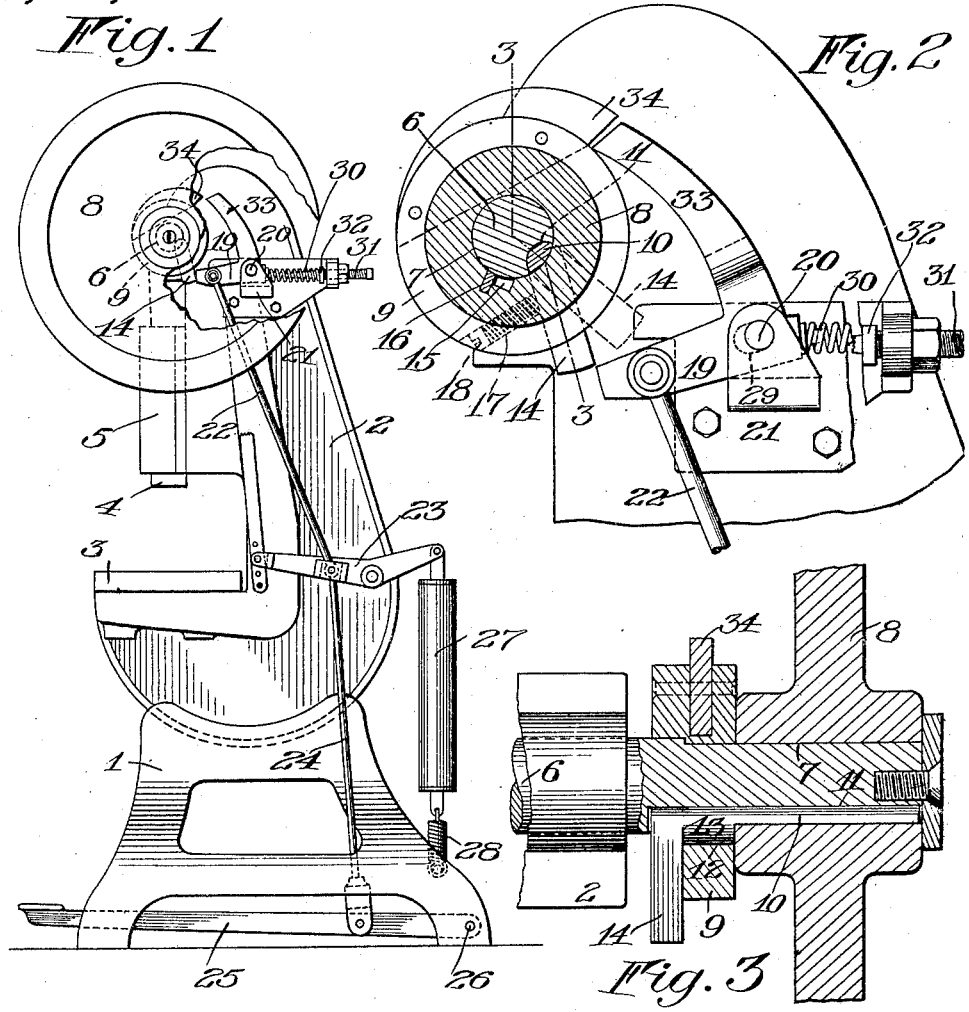

WILLIAM J. PARKINSON, OF ROCHESTER, NEW YORK, ASSIGNOR TO EASTMAN KODAK COMPANY, OF ROCHESTER, NEW YORK, A CORPORATION OF NEW YORK.

CONTROLLING DEVICE FOR PUNCH-PRESSES.

1,343,580.  Specification of Letters Patent.  Patented June 15, 1920.

Application filed October 15, 1917. Serial No. 196,559.

*To all whom it may concern:*

Be it known that I, WILLIAM J. PARKINSON, of Rochester, in the county of Monroe and State of New York, have invented certain new and useful Improvements in Controlling Devices for Punch-Presses; and I do hereby declare the following to be a full, clear, and exact description of the same, reference being had to the accompanying drawings, forming a part of this specification, and to the reference-numerals marked thereon.

My present invention relates to punch presses and more particularly to safety appliances therefor and it has for its object to provide a simple and dependable device that can be relied upon to cause the disengagement of the clutch and hence bring the ram to rest after each cycle of movement. A further object of the invention is to insure the return of the operating treadle by positively acting means after each cycle of operation instead of depending upon a spring or counterweight. To these and other ends the invention resides in certain improvements and combinations of parts all as will be hereinafter more fully described, the novel features being pointed out in the claims at the end of the specification.

In the drawings:

Figure 1 is a side elevation of a punch press constructed in accordance with and illustrating one embodiment of my invention, a part of the driving wheel being broken away to show details of the safety device which latter is in normal position;

Fig. 2 is an enlarged fragmentary view of a part of the safety mechanism taken in section through the drive shaft and showing the positions of the parts as the clutch goes into engagement, and Fig. 3 is an enlarged fragmentary detail section taken substantially on the line 3—3 of Fig. 2.

Similar reference numerals throughout the several views indicate the same parts.

In the present embodiment of the invention, 1 indicates the base; 2 the upper frame; 3 the bed, and 4 the ram of a punch press of a well known form. The ram operates in guides 5 and is reciprocated by a crank and connecting rod (not shown) from a shaft 6 journaled in the top of the frame 2. Rotatable freely on a reduced portion 7 of the shaft is the driving pulley 8 and adjacent to it is a clutch hub 9 suitably fixed to the shaft. A rocking clutch member 10 lies in a semi-cylindrical recess 11 in the shaft with its outer surface flush with the periphery of the shaft. Said clutch member has a bearing at 12 for a cylindrical portion 13 thereof in the hub 9 while an arm 14 extends from the bearing radially of the shaft at the inner side of the hub. A recess 15 in the bearing portion of the drive wheel 8 passes over the clutch member 10 as the wheel rotates and when pressure tending to tilt or cock the member 10 is exerted, it will throw said member into the recess 15 and into engagement with the wear plate 16 adjacent thereto to lock the wheel and shaft together. Such tendency to cock the clutch member 10 is normally exerted against the arm 14 by a spring 17 bearing thereagainst and adjustably confined by a plug screw 18 within a cavity in the hub 9. The position of the arm 14 when the clutch member 10 is in operative position is indicated by dotted lines in Fig. 2.

The clutch 10 is normally held inoperative against the tension of the spring 17 by a stop arm 19 pivoted at 20 to a bracket 21 on the frame 2. This position is shown in Fig. 1. A link 22 connects the stop arm 19 with a rocker arm 23 which, in turn, is connected by a link 24 with the usual operating treadle 25 pivoted at 26 to the base 1. Also connected to the rocker arm 23 at the rear of the machine is a counterweight 27 which counteracts the weight of this operating gear and the lower end of which I prefer to connect to the base 1 by a spring 28 which assists it and also prevents it from swinging. This counterweight, acting through the link 22, also has a tendency to normally hold the stop arm 19 in operative position in the path of the clutch arm 14 so that the clutch is held out and the drive wheel 8 rotates freely on the shaft 6.

In the operation of the device, each time the treadle 25 is depressed the stop arm 19 is withdrawn, the clutch arm 14 is released, as shown in Fig. 2, and the drive wheel 8 carries the shaft 6 around one revolution or until the stop arm is again introduced into the path of the clutch arm to straighten out the clutch member 10 and permit the drive wheel 8 to again rotate freely on the shaft 6. Preferably the stop arm 19 has slight movement on its pivot bearing 20 to reduce the shock of the impact as the clutch is thrown out. In the present instance, I slot the arm, as shown at 29 and provide a spring 30 that bears endwise against the arm 19 and holds the pivot pin 20 in the rear end of its slot. The spring may be supported on a threaded pin 31 having a collar 32 against which it abuts so that the tension may be regulated. Thus, the strain is imposed upon the pin 20 with less abruptness.

In the practice of my invention, I provide means for positively throwing the stop arm 19 back into the path of the clutch arm 14 to prevent the latter from making more than one revolution and hence the ram 4 from making more than one reciprocation. In the present instance, this means embodies a safety arm 33 integral with the arm 19 and forming therewith a bell crank lever. When the arm 19 is thrown out as in Fig. 2 to release the clutch arm 14 and cause the operation of the clutch, the arm 33 is correspondingly thrown in toward the center of rotation and into the path of a cam 34 on hub 9 as shown in Fig. 2. It falls in rear of the cam which travels in the direction of the arrow and when the drive wheel and shaft have traveled together for one revolution, the cam rocks the arm 33 back to its former position and hence the stop arm 19 is positively actuated back into the path of the clutch arm 14 to operate it and throw out the clutch as in Fig. 1. The safety function consists in the positive actuation of the arm 19 as distinguished from the further actuation thereof by the counterweight 27 and spring 28. The operator is led to expect a single operation of the ram 4 each time the treadle is pressed and hence an immediate repetition thereof is very apt to catch him off his guard and result in his serious injury. If the treadle remains down for any reason, such a repetition would occur without the arm 33 even with the presence of the counterweight 27 and spring 28. Without positively acting restoring means, no device can be called safe where springs or counterweights are relied upon.

Aside from drawing the stop arm 19 back into the path of the clutch arm 14, the arm 33 through links 22 and 24 raises the operating treadle 25. The treadle therefore cannot be held down during successive operations of the ram as it could were the arm 33 omitted and if it is the habit of the operator to let the weight of his leg remain on the treadle, the spring alone is not relied upon to return the latter.

I claim as my invention:

1. In a punch press, the combination with a rotary shaft, of a driving wheel therefor, a clutch member rotatable with the shaft and having a normal tendency to operatively connect the driving wheel and shaft, a stop arm mounted transversely to the shaft on a yieldable pivot, and normally engaged by the clutch member to release the same, a safety arm also arranged transversely to the shaft rigidly connected to the stop arm and normally in inoperative position, a device rotatable with the shaft and positively actuating said safety arm and connected stop arm at each revolution of the shaft to move said stop arm into engagement with the clutch member, and cause said safety arm to be released from positive actuation after the stop arm has engaged the clutch member.

2. In a punch press, the combination with a rotary shaft, a rotary driving wheel and a clutch member having a normal tendency to connect the two for movement and rotatable with the shaft, of a bell crank lever having a stop arm yieldably mounted normally in the path of the clutch member to release the same, and a safety arm in a plane transverse to the shaft and in substantially the same plane as the stop arm for positively throwing the stop arm into the path of the clutch member, a device upon one of the rotary elements for actuating said safety arm when in operative position, and an operating member connected to release the stop arm and to positively move said safety arm to operative position.

3. In a punch press, the combination with a rotary shaft, a rotary driving wheel, a cam on one of said elements and a clutch member having a normal tendency to connect the two elements for movement and rotatable with the shaft, of a stop normally in the path of the clutch member to release the same, an arm rigidly connected to the stop and actuated by the cam for positively throwing the stop into the path of the clutch member, said arm being normally in inoperative position, and an operating member connected to simultaneously release the stop and positively move the arm to operative position in the path of the cam, said stop being engaged by the clutch member while the cam acts upon the arm connected to the stop.

4. In a punch press, the combination with a rotary shaft, a rotary driving wheel, a cam upon one of said elements and a clutch member having a normal tendency to connect the two for movement and movable therewith, of a bell crank lever adapted to rock in a plane transverse to the axis of the shaft and having a stop arm normally in the path of the clutch member to release the same and a safety arm normally out of the path of the cam for positively throwing the stop arm into the path of the clutch member under the influence of the cam and an operating treadle connected to the bell crank for reversing the normal position of both arms thereof.

5. In a punch press, the combination with a rotary shaft, a rotary driving wheel and a clutch member for connecting the two for movement, of a foot treadle adapted to effect the operation of the clutch when depressed and a device positively actuated upon each rotation of the shaft connected to effect the release of the clutch and to positively raise the foot treadle to initial position, and to engage said clutch member during its positive actuation.

WILLIAM J. PARKINSON.

Witnesses:
 HELEN M. FRASER.
 MARGARET DUIGNAN.